(12) United States Patent
Park et al.

(10) Patent No.: US 6,556,543 B1
(45) Date of Patent: Apr. 29, 2003

(54) METHOD FOR DETERMINING MAXIMUM HOP COUNT IN BUS HAVING TREE STRUCTURE

(75) Inventors: Chang-won Park, Seoul (KR); Chang-kyu Beck, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/347,271

(22) Filed: Jul. 6, 1999

(30) Foreign Application Priority Data

Jul. 7, 1998 (KR) .............................. 98-27307
Jun. 18, 1999 (KR) .............................. 99-22919

(51) Int. Cl.⁷ .............................................. H04L 12/28
(52) U.S. Cl. ...................................... 370/255; 710/104
(58) Field of Search ................................ 370/252, 254, 370/255, 256, 257, 458, 445, 419, 438, 449–451; 710/100, 101, 104, 126

(56) References Cited

U.S. PATENT DOCUMENTS 5,687,319 A * 11/1997 Cook et al. ................. 370/256
5,844,902 A * 12/1998 Perlman ..................... 370/401
5,890,173 A * 3/1999 Yoda ......................... 707/501.1
6,122,248 A * 9/2000 Murakoshi et al. ......... 370/216

* cited by examiner

Primary Examiner—David Vincent
(74) Attorney, Agent, or Firm—Sughrue Mion, PLLC

(57) ABSTRACT

A method of determining the maximum hop count in a bus having a tree structure is provided. The method of determining the maximum hop count in a bus having a tree structure includes the steps of (a) configuring a first tree by setting an arbitrary node as a root node, (b) searching for the child node having the maximum length among the child nodes of the root node by scanning all the child nodes in the first tree, (c) configuring a second tree by setting the child node searched for in the step (b) as a new root node, (d) obtaining the maximum length by scanning all the child nodes in the second tree configured in the step (c), and (e) setting the maximum length obtained in the step (d) as the maximum hop count. Accordingly, it is possible to quickly obtain the maximum hop count.

6 Claims, 5 Drawing Sheets

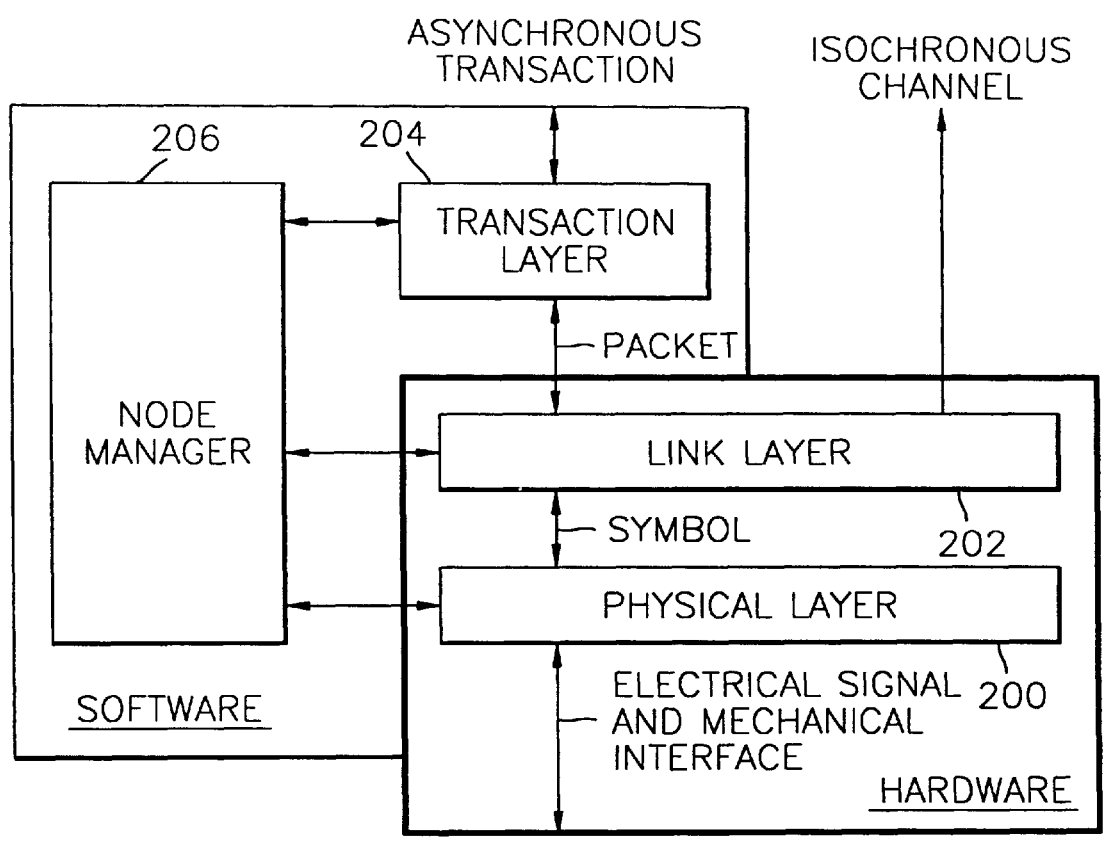

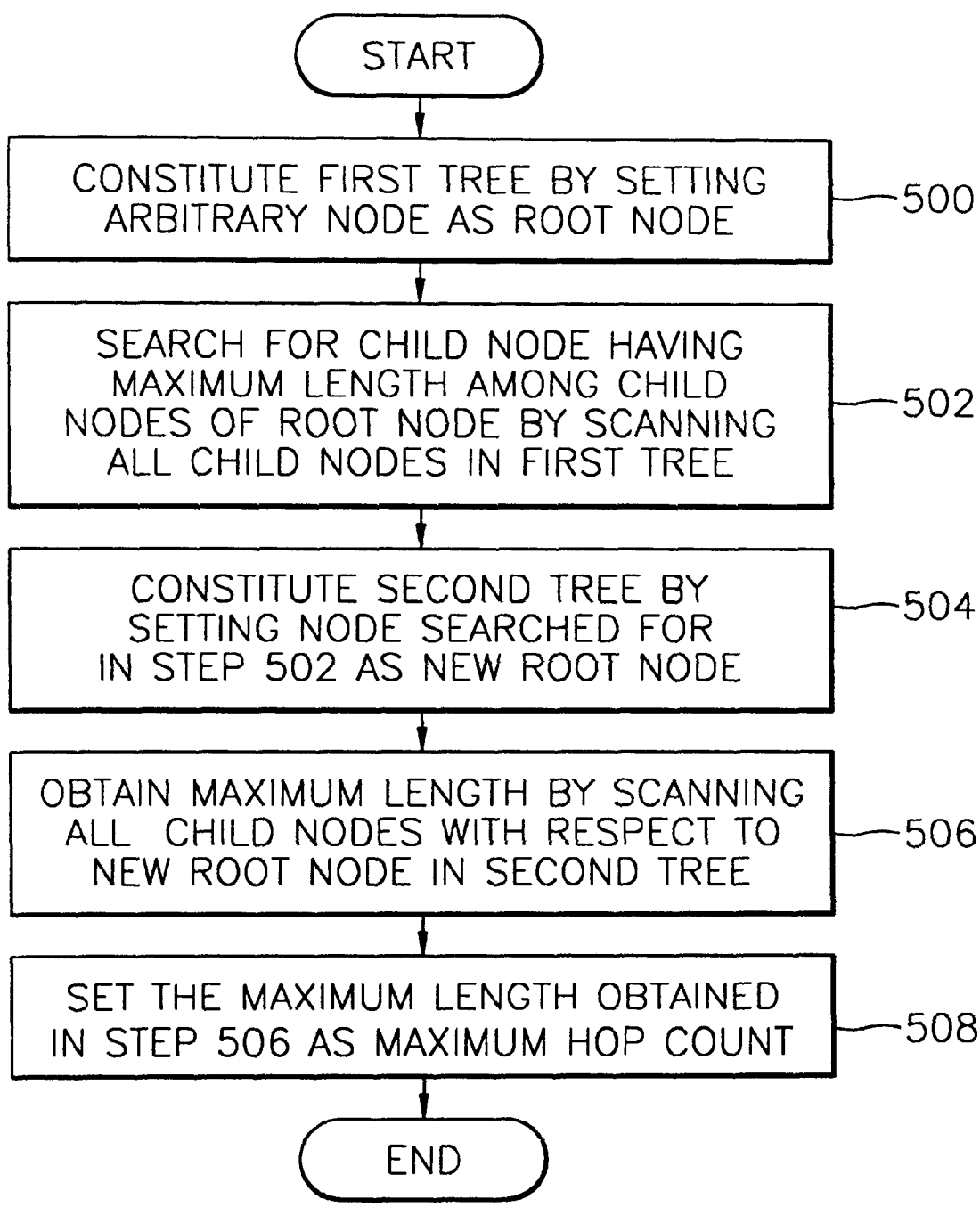

METHOD FOR DETERMINING MAXIMUM HOP COUNT IN BUS HAVING TREE STRUCTURE

BACKGROUND OF THE INVENTION

1. Field of the Invention

The present invention relates to a method for determining a hop count, and more particularly, to a method for determining the maximum hop count in a bus having a tree structure.

2. Description of the Related Art

The IEEE-1394 for digital network interfaces is currently being standardized. The IEEE-1394 bus has a digital bus protocol for connecting personal computers and digital electric home equipment to each other. The IEEE-1394 bus protocol is widely applied to equipment such as digital video cameras (DVC), hard disc drives (HDD), printers, and personal computers (PC). Also, the IEEE-1394 bus protocol is being extended from a bus protocol for simply connecting peripheral equipment of computers, to a network protocol for performing data transmission among various systems such as PCs.

FIG. 1A is a block diagram showing an example of on IEEE-1394 bus having a tree structure. Referring to FIG. 1A, a plurality of apparatuses 100 through 108 which satisfy the IEEE-1394 standard are connected to the IEEE-1394 bus by 1394 cable. Here, the 1394 cable should not have loops. Namely, there should be only one 1394 cable path connecting one apparatus to another.

FIG. 1B illustrates the structure of ports connected to the IEEE-1394 bus. Referring to FIG. 1B, the apparatus connected to the IEEE-1394 bus includes ports (port0 through port2) to which the cable is connected. A node ID is designated to the apparatus. When an apparatus transmits data to, and receives data from, another apparatus, node IDs are used as the addresses of the concerned apparatuses. Node IDs are re-assigned whenever the bus is reset.

FIG. 2 schematically shows a protocol stack used in the IEEE-1394 standard. The protocol stack shown in FIG. 2 is necessary in order to operate the IEEE-1394 bus. Here, a physical layer 200 and a link layer 202 are realized as hardware in the form of an integrated circuit (IC) chip. A transaction layer 204 and a node manager 206 are realized as software.

The network connected by the IEEE-1394 bus is changed from a normal bus operation state to a bus reset state when a new apparatus is connected to the network through an arbitrary port on the network, or when a connected apparatus is removed from the network. Such a state transition is detected by the physical layer shown in FIG. 2. When a state transition is detected, a bus re-alignment process having the following sequence is performed.

In a bus reset state, a tree identification step is performed. In this step, it is sensed whether loops are formed in the connected state of a bus, and a root node for forming a tree is determined. Then, a self-identification step is performed. Each node determines the IEEE-1394 node ID thereof and broadcasts this to other nodes. Then, an isochronous manager determining step is performed to determine a node for managing an isochronous resource. Finally, a manager determining step is performed to determine a node for managing bus configuring information items. In this step, a topology map and a speed map are established and a gap count is optimized. The gap count is optimized by obtaining the maximum of the node to node hop counts for every possible combination of pairs of the bus in the topology map, obtaining the gap count using a table of the IEEE-1394 standard using the maximum value, and designating the gap count of the nodes using a physical layer configuring packet.

As mentioned above, the maximum hop count is used for extracting the gap count of the IEEE-1394 bus. The gap count is broadcast to the respective nodes by the physical layer configuring packet, thus determining the subaction gap of the bus as the optimal value. Therefore, the process of obtaining the maximum hop count is essential for effectively using the bandwidth of the 1394 bus. Such a gap count optimizing process is currently specified in the IEEE-1394 standard. However, methods of determining hop counts among all nodes and the maximum value among the hop counts are not specified in the IEEE-1394 standard at present. Therefore, for obtaining the maximum hop count, at present, the hop counts among all the nodes should be determined simply. There is a problem in that the amount of calculation is very large when many nodes are connected to the bus.

There is an algorithm for the shortest path of every possible combination of pairs or a method provided in the U.S. Pat. No. 5,687,319 by Cook, in another conventional method for solving this problem. According to the methods provided in the above references, the amount of calculation is reduced by some degree. However, the amount of calculation is still large since the calculation is performed in proportion to the square of the number of nodes.

SUMMARY OF THE INVENTION

To solve the above problem, it is an objective of the present invention to provide a method of quickly determining the maximum hop count.

Accordingly, to achieve the above objective, there is provided a method of determining the maximum hop count in a bus having a tree structure, comprising the steps of (a) obtaining hop counts with respect to all the child nodes of each node, obtaining hop counts with respect to all the possible combinations of node pairs in a sub tree in which each node is used as a root node, and obtaining the maximum value among the obtained hop counts as the first maximum value, (b) obtaining the sum of the upper two hop counts having the largest values among the hop counts to a leaf node in the sub tree, as the second maximum value, with respect to all the child nodes of each hop, and (c) determining a larger value between the first maximum value and the second maximum value as the maximum hop count, wherein the maximum value among the maximum hop count values of the respective nodes is determined as the maximum hop count of the bus tree by performing the steps (a) through (c) with respect to all the nodes.

To achieve the above objective, there is provided another method of determining the maximum hop count in a bus having a tree structure, comprising the steps of (a) configuring a first tree by setting an arbitrary node as a root node, (b) searching for the child node having the maximum length among the child nodes of the root node by scanning all the child nodes in the first tree, (c) configuring a second tree by setting the child node searched for in the step (b) as a new root node, (d) obtaining the maximum length by scanning all the child nodes in the second tree configured in the step (c), and (e) setting the maximum length obtained in the step (d) as the maximum hop count.

BRIEF DESCRIPTION OF THE DRAWING(S)

The above objective and advantages of the present invention will become more apparent by describing in detail a preferred embodiment thereof with reference to the attached drawings in which:

FIG. 1 shows an example of a network constituted of IEEE-1394 equipment;

FIG. 2 schematically shows a protocol stack used by IEEE-1394 equipment;

FIG. 5 is a flowchart showing a method of determining the maximum hop count according to another embodiment of the present invention.

DESCRIPTION OF THE PREFERRED EMBODIMENTS

Hereinafter, embodiments of the present invention will be described in detail with reference to the attached drawings.

Figure 1A:
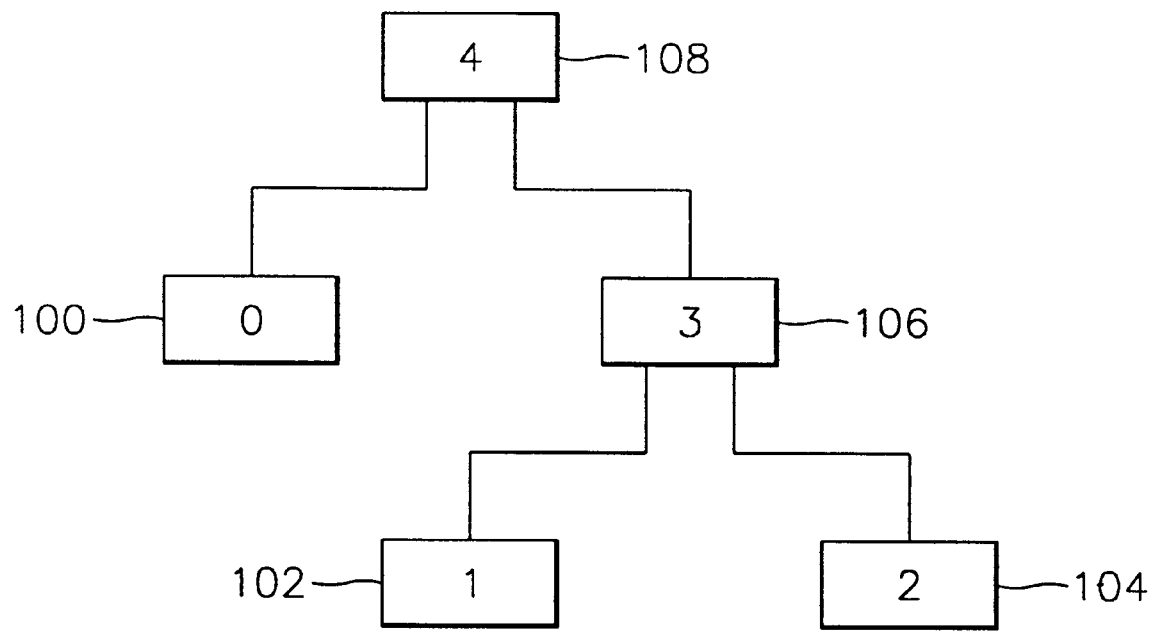
Figure 1B:
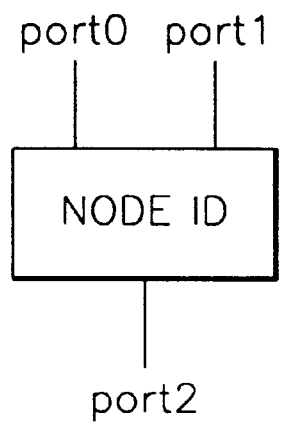
Figure 3:
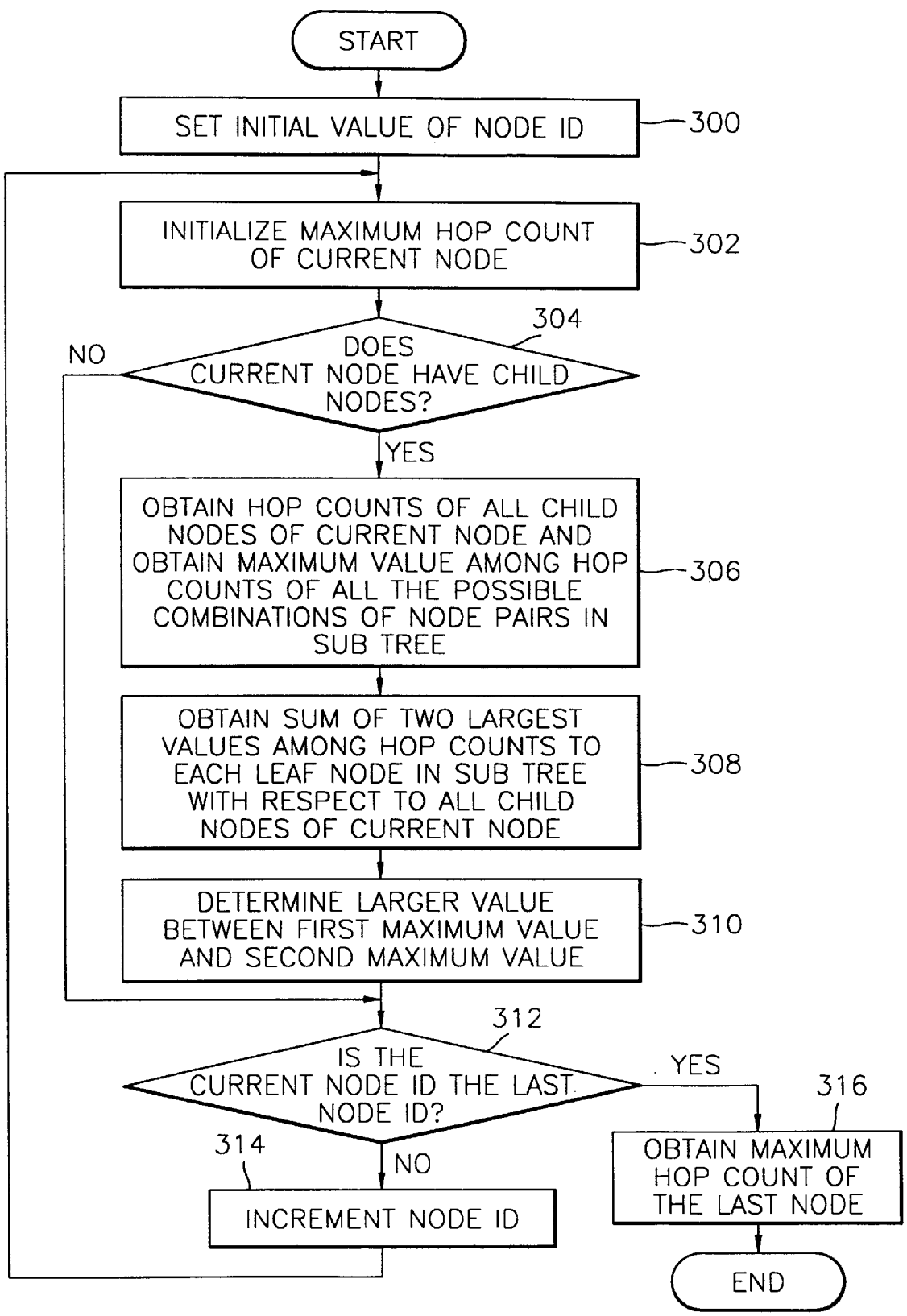
FIG. 3 is a flowchart for describing a method of determining the maximum hop count according to an embodiment of the present invention.
Figure 4:
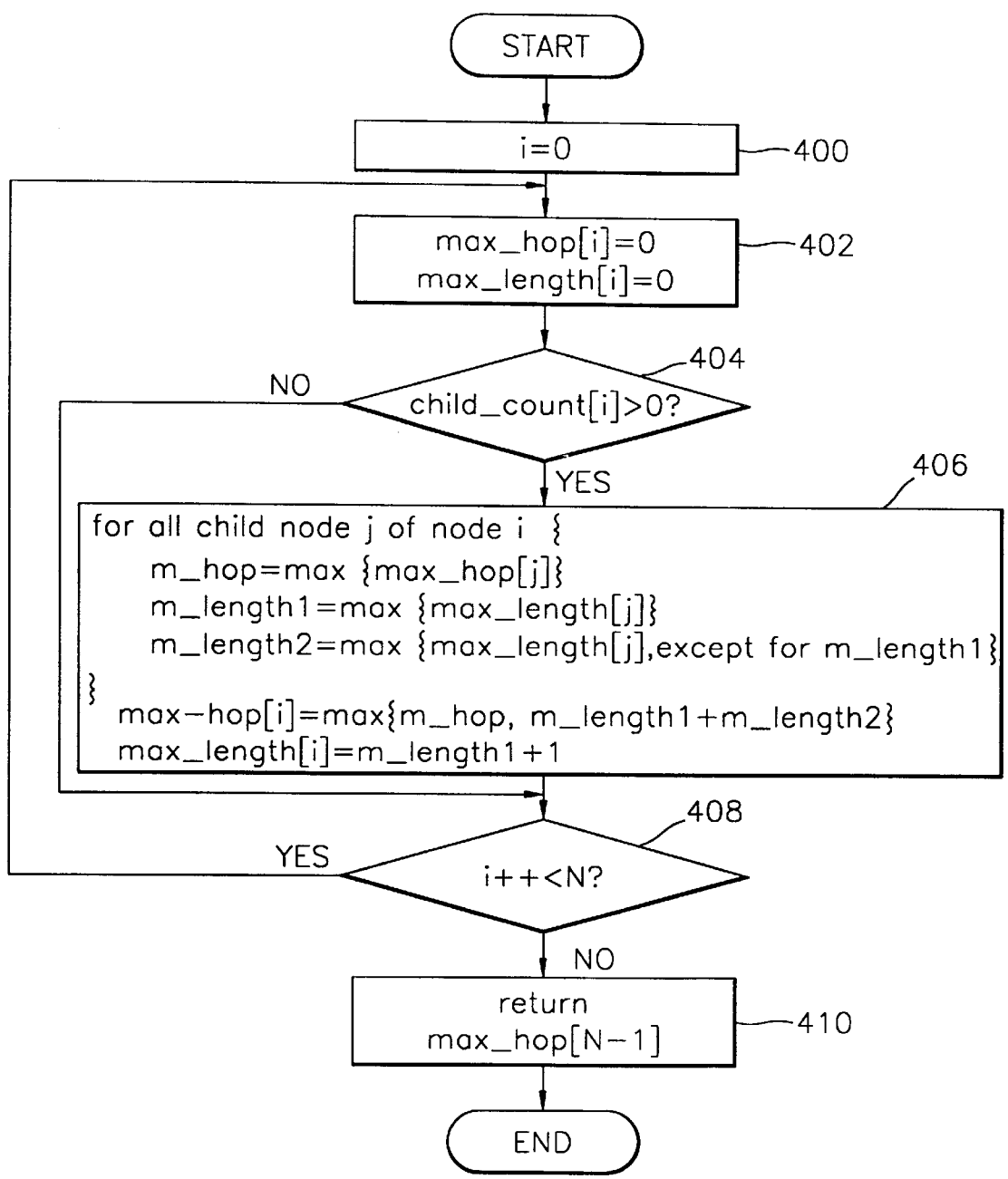
FIG. 4 is a flowchart showing a programming method for realizing the method of FIG. 3.

FIG. 3 is a flowchart describing a method of determining the maximum hop count according to an embodiment of the present invention. FIG. 4 is a flowchart describing a programming method for realizing the method of FIG. 3. FIG. 4 will be referred to hereinafter when necessary.

The method of determining the maximum hop count provided in the present invention is based on the following. When the maximum hop path (max_hop path) is the path for connecting a node A to a node B in nodes connected to each other in the form of a tree, the maximum hop path may or may not pass the root node of the tree. Namely, the length of the maximum hop path is found in the following two cases.

First, when the path for connecting the node A to the node B passes the root node, the length of the maximum hop path is expressed as m_length1+m_length2. Here, m_length1 and m_length2 are hop counts to the two most remote leaf nodes from the root node.

When the path for connecting the node A to the node B does not pass the root node, the length of the maximum hop path (m_hop_length) is expressed as sub_hop_length. Here, sub_hop_length corresponds to the maximum hop count among the sub trees which do not include the root node.

The maximum hop count is obtained using topology map information. Since the detailed content of the topology map can be obtained with reference to the IEEE-1394 standard, a detailed description thereof will be omitted. It is assumed that the number of child nodes (child_count[i]) connected to each of the nodes is obtained from the topology map for the convenience of explaining the process of calculating the maximum hop count.

When the variable i represents the node IDs of the respective nodes, the max_hop[i] and max_length[i] of all the nodes are obtained by increasing the nodes by one from the node ID 0 to the node ID N−1. Here, max_hop[i] is the maximum value of the hop counts of all the possible combinations of node pairs in the sub tree in which an arbitrary node (node[i]) is used as the root node. Also, max_length[i] is the maximum value of the hop counts from an arbitrary node (node[i]) to a leaf node in the sub tree in which the arbitrary node (node[i]) is used as the root node.

According to the method of determining the maximum hop count of the present invention, the initial value of the node ID is set (step 300). Then, the maximum hop count of the current node is initialized to 0 (step 302). For performing programming, the variable I is defined as the node ID for indexing each node and is initialized by setting it to 0 (step 400). Then, max_hop[i] and max_length[i] are initialized by setting the same to 0 (step 402).

Then, it is determined whether the current node has child nodes by obtaining the maximum hop count of all the nodes (step 304). Since it was assumed that the number of child nodes (child_count[i]) connected to the respective nodes was previously obtained using the topology map, it is determined whether child_count[i] is larger than 0 (step 404).

When there are child nodes connected to the current node in the step 304, the hop counts of all the child nodes connected to the current node are obtained, and the maximum value of the hop counts of all the possible combinations of node pairs in the sub tree in which the current node is the root node, is obtained as the first maximum value (step 306). Then, the sum of the two largest values among the hop counts to each of the leaf nodes in the sub tree is obtained as the second maximum value, with respect to all the child nodes of the respective nodes (step 308). Then, the largest between the first maximum value and the second maximum value is determined as the maximum hop count (step 310). After performing the step 310, it is determined whether the current node ID is the last node ID (step 312). If not, the step 302 is performed again after incrementing the node ID (step 314). Namely, the maximum hop count of each node is determined by performing the above steps 306 through 310. Also, when it is determined that the current node is the last node in the step 312, the maximum hop count of the node is obtained by the above method (step 316). Since the hop count is updated to the largest value, the maximum hop count of the last node is the maximum hop count of the bus tree.

The pseudo code for the above method is explained as follows for programming. For example, when the node IDs of the child nodes of the node i are $c\_0, c\_1, \ldots, c\_m$ (where m is the number of the child nodes of the node i and $c\_0, c\_1, \ldots, c\_m < i$.), the maximum hop count (max_hop[i]) of the node i is expressed as follows.

$$\text{max\_hop}[i] = \max\{\text{max\_hop}[c\_0], \text{max\_hop}[c\_1], \ldots, \text{max\_hop}[c\_m], \text{m\_length1} + \text{m\_length2}\}$$

wherein, the max_hop[c_0], max_hop[c_1], ..., and max_hop[c_m] respectively represent the hop counts of all the child nodes of the node I, and m_length1 and m_length2 represent the hop counts from the node i to the two remotest leaf nodes in the sub tree in which the node i is the root node. The first maximum value obtained in the step 306 is the maximum value among max_hop[c_0], max_hop[c_1], ..., and max_hop[c_m]. The second maximum value obtained in the step 308 corresponds to m_length1+m_length2. The largest between the two maximum values is the maximum hop count of the node i (max_hop[i]).

Also, the max_length[i] of the node i is expressed as follows.

$$\text{max\_length}[i] = m\_\text{length1} + 1$$

The step 406 in FIG. 4 corresponds to the steps 306 through 310. The max_hop[i] of each of the nodes 0 through N−1 are obtained by equation (steps 402 through 408). Finally, the maximum hop count (max_hop[N−1]) of the tree in which the node N−1 is the root node, is obtained (step 410). This maximum hop count is the same as the maximum hop count of the overall bus.

As mentioned above, according to the present invention, the maximum hop count among the nodes is effectively calculated using the topology map of a bus manager when various apparatuses are connected to a high-speed serial bus such as the IEEE-1394 bus in the form of a tree.

FIG. 5 is a flowchart describing a method of determining the maximum hop count according to another embodiment of the present invention. Referring to FIG. 5, in the method of determining the maximum hop count according to the present invention, a first tree is configured using an arbitrary node as a root node (step 500). Such a tree is generally called a node tree. Such a node tree can be configured by software using information related to the node tree, extracted from a self identifier issued by each node. Since a method of configuring the node tree is known to those skilled in the art, a detailed description thereof will be omitted.

Then, the child node having the maximum length among the child nodes of the root node is searched for by scanning all the child nodes of the first tree (step 502). Here, since the term, length actually has the same meaning as that of the term, depth, the length can be replaced by the depth. Also, any method related to depth search in the data tree structure, known to those skilled in the data structure field, can be used for scanning the nodes.

A second tree is configured by setting the child node having the maximum length searched for in the step 502, as a new root node (step 504). The child node having the maximum length in the first tree is a leaf node in the first tree. Configuring the second tree by setting the leaf node as a root node can be simply performed by using the leaf node having the maximum length in the first tree as the uppermost root node and reversing the remaining nodes of the node tree.

The maximum length is obtained from the second tree configured in the step 504 (step 506). The step 506 has the same processes as those described in the step 502. In the step 506, it is not necessary to confirm which node has the maximum length. As long as the value of the maximum length is obtained.

Finally, the maximum length obtained in the step 506 is set as the maximum hop count (step 508).

The maximum hop count obtained by the above method precisely coincides with the actual maximum hop count of the tree structure. Also, it is possible to consistently calculate the maximum hop count within a short amount of time no matter which node is selected as the root node in the step 504.

In the case of the IEEE-1394 bus, only two or less nodes can be connected to one node. According to the present invention, in such a bus structure, node scanning is performed twice in order to obtain the node having the maximum length. Therefore, according to the present invention, when the number of the nodes is a predetermined positive integer N, it is possible to calculate the maximum hop count by performing node scanning 2☐ times. Namely, according to the present invention, it is possible to obtain the maximum hop count more quickly than in a conventional method.

Also, the method of determining the maximum hop count according to the present invention can be written as a program which can be executed in a computer. The program can be recorded on a medium used for a computer. Such a program is executed in a general purpose digital computer. A magnetic recording medium such as a floppy disk and a hard disk and an optical recording medium such as a CD-ROM and a DVD can be used as the medium. Also, the functional program, code, and code segments can be easily inferred by a programmer in the technical field to which the present invention belongs.

What is claimed is:

1. A method of determining a maximum hop count in a bus having a tree structure, comprising the steps of:

(a) obtaining hop counts with respect to all child nodes of each node, obtaining hop counts with respect to all possible combinations of node pairs in a sub tree in which each node is used as a root node, and obtaining a maximum value among the obtained hop counts as a first maximum value;

(b) obtaining a sum of the two hop counts having the largest values among the hop counts to a leaf node in the sub tree, as a second maximum value, with respect to all child nodes of each hop; and (c) determining a larger value between the first maximum value and the second maximum value as the maximum hop count, wherein a maximum value among the maximum hop count values of the respective nodes is determined as the maximum hop count of the bus tree by performing the steps (a) through (c) with respect to all nodes.

2. The method of claim 1, wherein the bus is a high-speed serial bus.

3. The method of claim 2, wherein the high-speed serial bus follows the IEEE-1394 standard.

4. A method of determining a maximum hop count in a bus having a tree structure, comprising the steps of:

(a) configuring a first tree by setting an arbitrary node as a root node;

(b) searching for a child node having a maximum length among all child nodes of the root node by scanning all child nodes in the first tree;

(c) configuring a second tree by setting the child node searched for in the step (b) as a new root node;

(d) obtaining the maximum length by scanning all the child nodes in the second tree configured in the step (c); and (e) setting the maximum length obtained in the step (d) as the maximum hop count.

5. The method of claim 4, wherein the bus is a high-speed serial bus.

6. The method of claim 5, wherein the high-speed serial bus follows the IEEE-1394 standard.

* * * * *